April 18, 1944.   J. B. MARIS   2,346,694
ADJUSTABLE AUTOMATIC INTERVAL TIMER
Filed Feb. 13, 1941   3 Sheets-Sheet 1
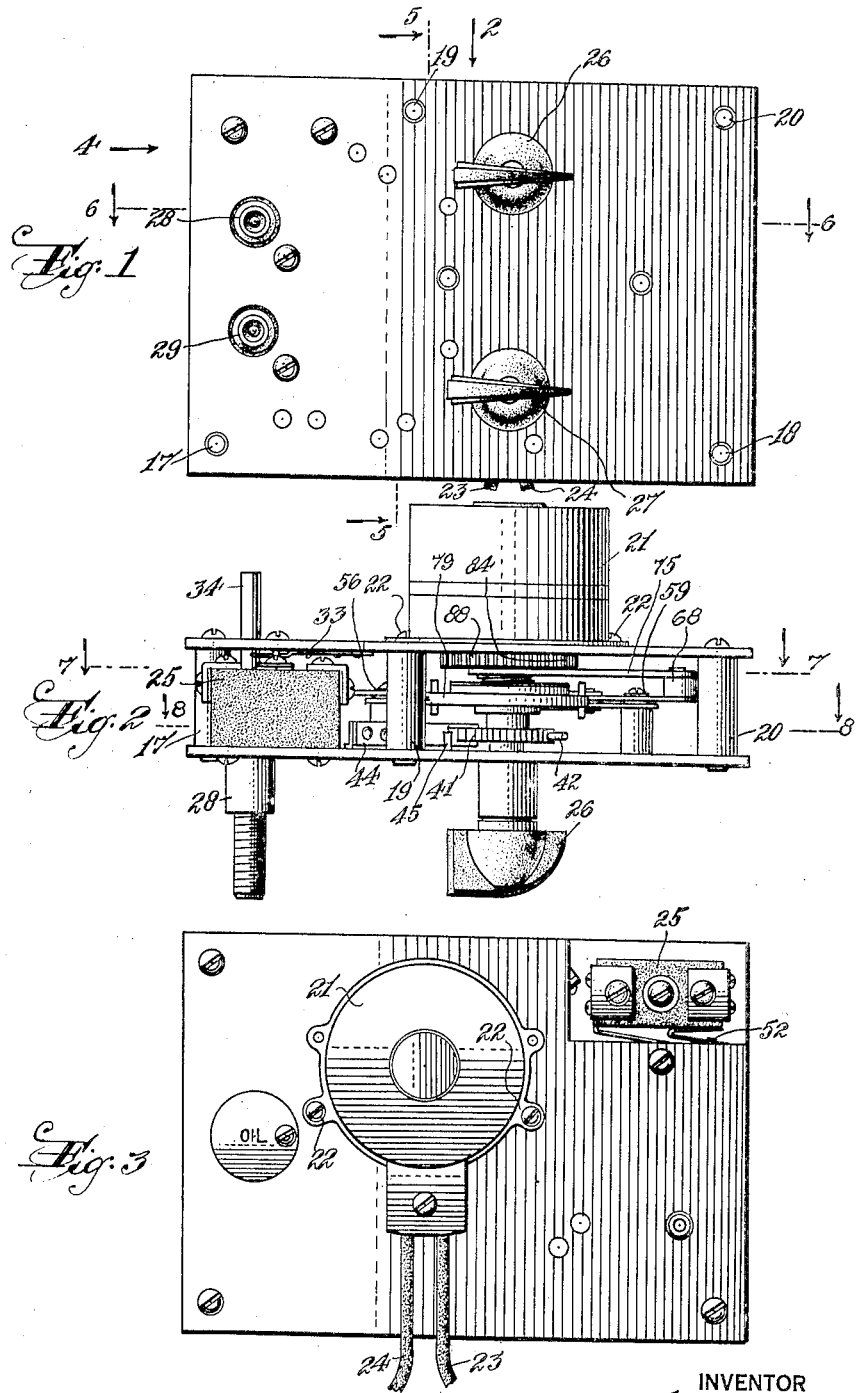
INVENTOR
James B. Maris
BY
ATTORNEY

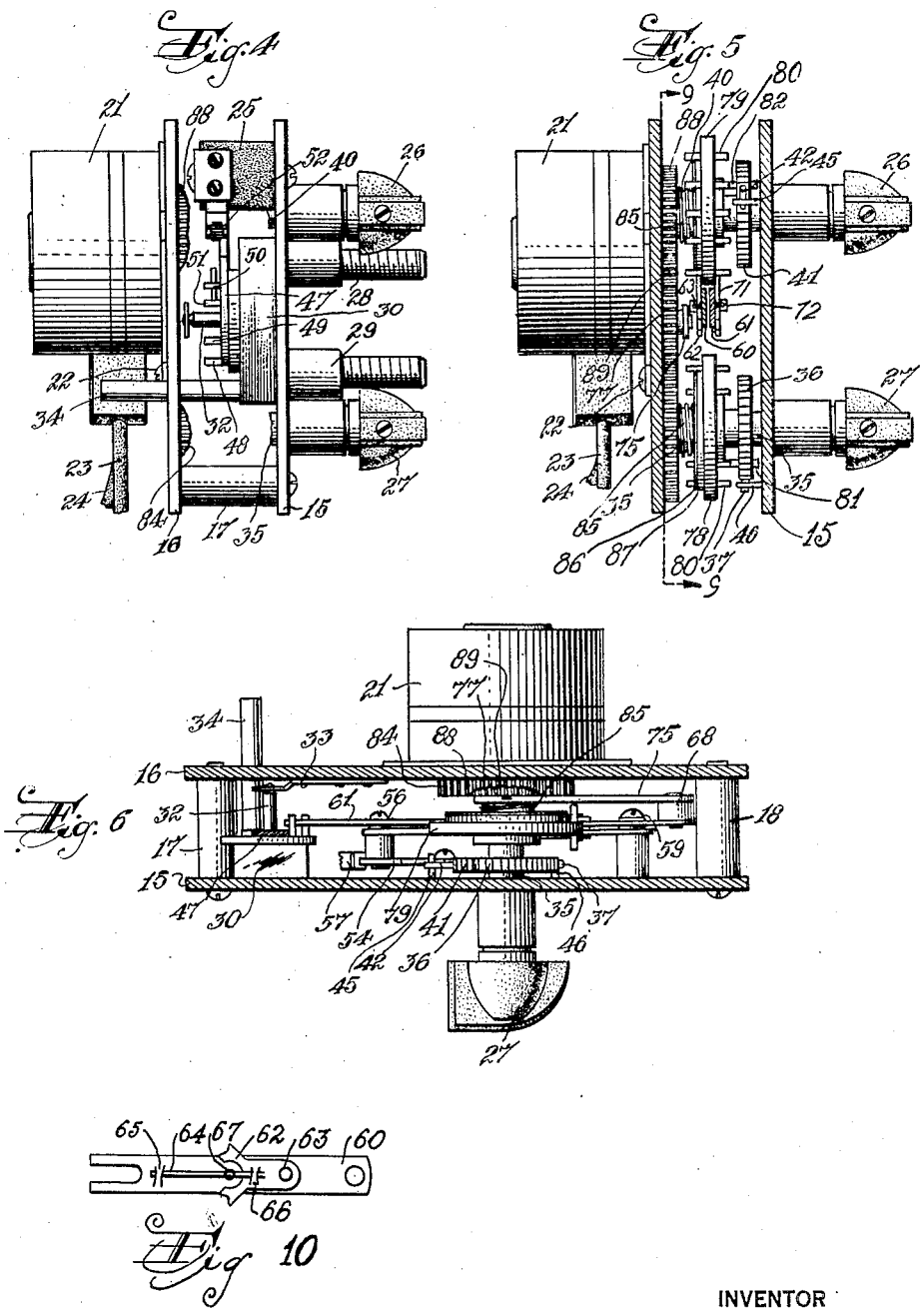

April 18, 1944.    J. B. MARIS    2,346,694
ADJUSTABLE AUTOMATIC INTERVAL TIMER
Filed Feb. 13, 1941    3 Sheets-Sheet 3

INVENTOR
James B. Maris
BY M. Bounds
ATTORNEY

Patented Apr. 18, 1944

2,346,694

UNITED STATES PATENT OFFICE 2,346,694

ADJUSTABLE AUTOMATIC INTERVAL TIMER

James B. Maris, Glen Ridge, N. J.

Application February 13, 1941, Serial No. 378,711

7 Claims. (Cl. 161—1)

This invention relates to improvements in adjustable automatic interval timers of the type where, for instance, an electrical switch and a pressure valve may be turned "on" and "off" at given periodic intervals and where the time "on" and the time "off" is independently and quickly adjusted by manual means.

Interval timers are widely used in industry for many important control purposes such as turning "on" and "off" valves, controlling heating and cooling operations, controlling the duration of chemical reactions, controlling the sequences of complicated chemical processing operations, etc. While the interval timers, as such usually operate to turn "on" and "off" a switch or relay acting as the primary impulse for the activation of further control equipment, the timer invariably furnishes a series of operations which are repeated with definite time intervals. The complete sequence of "on" and "off" operations is commonly called one operational cycle with reference to their similarity to the well known trigonometric functions. These functions usually have a positive half cycle and a negative half cycle which respectively correspond to the "on" and "off" periods produced by the timer. The time between the start and end of a complete cycle is defined as the period of same even though one such cycle may represent several sequential "on" and "off" intervals. The term intervals is hereinafter used to define the time element between any two subsequent operations performed by the timer. These intervals may thus be any fraction of a complete period and these intervals are thus the governing time factors of their respective parts of the operational cycle. The present timer is of a type which controls a complete cycle having one positive "on" interval and one negative "off" interval. In the present timer these two intervals are manually adjustable and may be independently varied to a considerable extent. Inasmuch as the complete period which is repeated by the timer will consist of the sum of the two variable half periods, the total period is thus also variable inside certain limits.

An important object of my invention is to provide a simple, light weight, compact, silent assembly of apparatus having a reliable and positive cycle of operation for controlling electrical circuits and/or valves, etc., at given periodic intervals, said intervals being quickly adjustable by manual setting of two knobs.

A further object of my invention is to provide an efficient, low cost, silent, synchronous motor driven combination time switch and valve permitting the manual selection of numerous "on" and "off" intervals, said periods being adjustable independent of one another.

Another object of my invention is to provide an interval timer where the "on" and "off" intervals may be quickly selected by manually turning a knob for each and where the adjustable range may be changed by supplying motors of different speeds.

Other objects and advantages of the invention will be apparent during the course of the following description.

In the accompanying drawings, forming a part of this specification, and in which like numerals are employed to designate like parts throughout the same, Figure 1 is front elevation of a timer assembly embodying my invention, Figure 2 is a top plan along arrow 2 in Figure 1, Figure 3 is a rear view of the timer, Figure 4 is an elevation of the timer with synchronous motor mounted in place, and with some parts omitted for sake of clearness, Figure 5 is a cross-section taken on line 5—5 of Figure 1 with parts omitted for sake of clearness, Figure 6 is a cross-section taken on line 6—6 of Figure 1 with certain parts omitted for sake of clearness.

Figure 10 represents a detail view of the fixed pawl plate.

Figure 7:
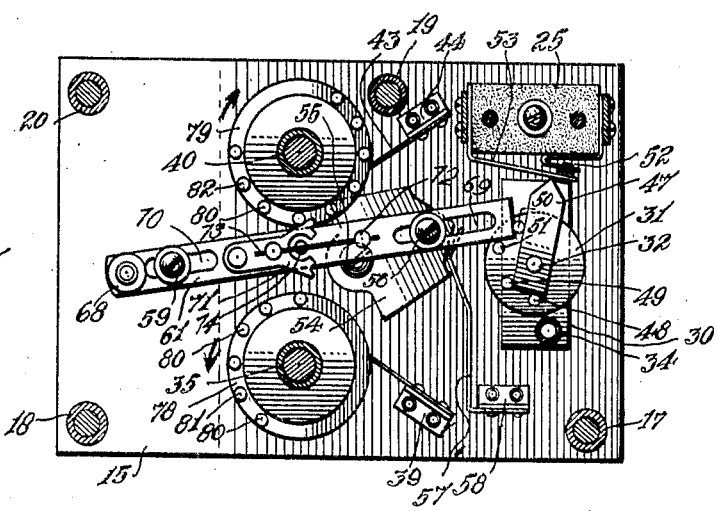
Figure 7 is a cross-section on line 7—7 of Figure 2.

In the drawings, wherein for the purpose of illustration, is shown a preferred embodiment of my invention, the numerals 15 and 16 designate the mounting plates between which the timer mechanism is mounted, see Figures 1 to 8, inclusive. The two plates 15 and 16 are held together by four posts, 17, 18, 19 and 20 which are rigidly fastened into plate 15 with one end. The other end of the posts 17 to 20 have shoulders fitting to corresponding holes in plate 16 which is held to same by screws. A cover, not shown in the drawings, may be placed over the opening between the plates 15 and 16 thereby preventing dust from entering the assembly. Another cover may be placed over the opening over the terminals, see Figure 3, for the same purpose.

In Figures 2, 3, 4, 5 and 6 is shown how the synchronous motor 21 is mounted to plate 16 with the screws 22. The leads 23 and 24 from the synchronous motor are brought over to the terminal block 25 where the outside line is also connected. On the front face of the timer, see Figures 1 and 2, are two knobs 26 and 27. Knob 26 serves to select the desired number of minutes "off" while knob 27 controls the number of minutes of the "on" interval. The face of the instrument also carries two valves 28 and 29. These consist of the usual tubular outer valve housing which are the outlet connections of the automatic valve and inside of said tubular bodies are inserted the common threaded valves similar to the Schrader valves as used in automobile tubes. They are so arranged that when the connection is made to the threaded ends the spring loaded valves inside of same are automatically opened and similarly by unscrewing the connection the valve is automatically closed. The valve block 30 is mounted on the inside of plate 15, see Figures 4, 7 and 8. It carries the spring loaded valve disc 31 which is rotatable on pivot 32 which is again pressed down into intimate contact with block 30 by the spring 33, see Figure 6. The valve block 30 also has an inlet tube 34 which projects to the rear through plate 16 and which is suitable for permanent connection to a pump or other apparatus by means of an ordinary rubber hose.

Figure 8:
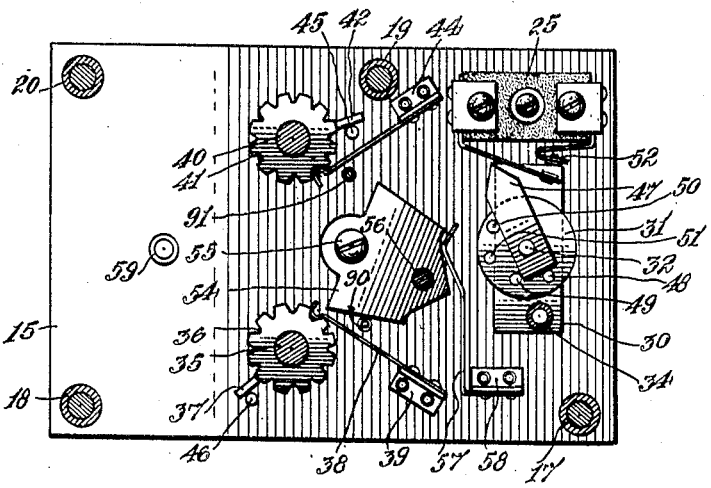
Figure 8 is a cross-section on line 8—8 of Figure 2.

Referring now to Figures 7 and 8, the shaft 35, on which the knob 27 is mounted on the front of the timer, extends through plate 15 and carries the index wheel 36 having a stop pin 37 and with the stop spring 38 engaged in the notches in the index wheel 36. The stop spring 38 is fastened to plate 15 by means of the angle 39. Similarly the shaft 40, on which is mounted the knob 26 on the front of the timer, extends through plate 15 and carries the index wheel 41 with the stop pin 42. The stop spring 43 is engaged in the notches of the wheel 41 and is fastened to plate 15 by angle 44. The index wheel 36 serves to select the desired time interval for the "off" period while the index wheel 41 serves to select the "on" period. The stop pin 45 serves to limit the travel of pin 42, while the stop pin 46 limits the travel of pin 37.

Referring again to Figures 7 and 8, it will be seen that the rotary valve disc 31 carries an insulating cam 47. The opening 48 in disc 31 communicates with the valve chamber connecting inlet tube 34 with the two outlet tubes 28 and 29. When valve disc 31 is in the position shown in Figure 8 the valve is open and any pressure existing in the valve chamber is released through opening 48. When, however, the valve is in the position shown in Figure 7, opening 48 is closed against the surface of block 30 and the pressure is "on." The valve disc 31 carries two pins 49 and 50 extending outwardly away from plate 15 as shown in Figures 7 and 8. A stop pin 51 extends toward plate 15 and acts to limit the travel of disc 31 when same is turned around its pivot 32. The pin 51 will strike against the side of block 30 thus permitting only a limited angle of travel. The terminal block 25 carries a switch which in the preferred embodiment illustrated in the drawings consists of a single pole, single throw arrangement comprising the two springs 52 and 53 each fastened at one end to the terminal block 25. In Figure 8 the switch is shown in its open position while in Figure 7 the same is closed by the engagement of the insulating cam 47. It is obvious of course that instead of the single pole, single throw arrangement it is equally possible to operate a multi-pole, multi-throw switch by the same method.

A throw-over cam 54 is rotatably mounted upon stud 55 on plate 15, see Figures 7 and 8. The cam 54 carries a stud 56 and it is in operable engagement with spring 57 mounted on plate 15 by angles 58. A stud 59 is mounted on plate 15 at a distance away from stud 55. A fixed pawl plate 60 is mounted on studs 56 and 59 while a slidable pawl plate 61 is slidably mounted on the same studs, see Figure 7. The pawl plates 61 and 60 are shown in side view in Figures 2 and 6, and a cross-section view of same is shown in Figure 5. The fixed pawl plate 60 carries the pawl 62 which is pivoted at one end to pivot 63. A spring 64 is fastened with one end at 65 to plate 60 while the other end is fastened at 66 to the pawl 62. A stop 67 limits the travel of the pawl 62 on both sides while the spring 64 serves to bring the pawl back to its central position see Figure 10. The sliding pawl plate 61 carries a stud 68 at one end and has two longitudinal slots 69 and 70. The pawl 71 is pivoted on pivot 72 and a pawl spring 73 is fastened at one end to the plate 61 and at the other end to the pawl 71 while the stop 74 serves to limit the sidewise travel of the pawl 71 see Figure 7. The pawl plate 60 is mounted with the pawl 62 downward toward plate 15 while the pawl plate 61 is mounted with the pawl 71 on the opposite side, as may be seen in Figure 7, the pawl plate 60 is thus exactly reverse in reference to the pawl plate 61 and is similar to same as shown in Figures 7 and 10. The sliding pawl plate 61 is given a reciprocating motion through the connecting rod 75 which is fastened at one end to stud 68 on plate 61. The other end of the connecting rod 75 is rotatably fastened to the crank 76 of the gear 77.

Referring now to Figure 7, it will be seen that shafts 35 and 40 carry the similar pin racks 78 and 79, each of which have a number of axially extending pins 80 along their outer periphery. These pins extend a short distance on either side of the discs as indicated in Figure 5. The ends of the next to the last pin 81 of the disc 78 extend further toward plate 15 than the others, see also Figure 9. The disc 79 has a similar long pin 82 which extends toward plate 15. The construction of the pin racks 78 and 79 is similar and is shown in detail in Figures 5 and 7. The bushing 83 has a shoulder at one end and extends through disc 78 and is rigidly fastened with its other end to the gear 84. The disc 78 is loose on the bushing but the spring 85 exerts a pressure on the washer 86 which again presses on washer 87 which is of felt or fibrous material and which exerts a frictional contact with disc 78. When gear 84 is turned, therefore, there will be a frictional drag which will tend to move disc 78 in the same direction. The same holds for disc 79 which is driven by the gear 88, see Figures 5, 6 and 7.

Figure 9:
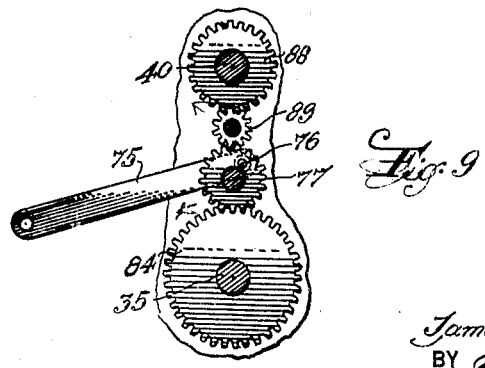
Figure 9 is a partial cross sectional view taken along 9—9 in Figure 5.

In Figure 9, is shown how the gears 84 and 88 are driven from the synchronous motor 21. The pinion 89 is mounted on the shaft of the motor 21 and extends through plate 16 into direct engagement with gears 77 and 88 and thus drives both of these gears at the same time see also cross-section in Figure 5. Gear 77 is in engagement with gear 84 and drives same in the opposite direction of the rotation of gear 88. Gear 77, through the crank 76 and the connecting rod 75, also drives the sliding pawl plate 61 and gives same a continuous reciprocating motion.

The operation of my invention is as follows: For a given application the motor speed is calculated to give, for instance, a one minute interval for each of the notches in the index gears 36 and 41. It is also of course possible to select motor speeds which will give any other desirable time intervals for each notch of gears 36 and 41. By thus selecting manually the desired time intervals "on" and "off" by turning knobs 26 and 27, the device may be set for repeating at these intervals indefinitely and during each period the switch 52 and valve 30 which closed and opened for the respective time intervals selected. The turning of the index gear 36 in a clockwise direction will limit the travel of the long pin 81 of disc 78 which governs the time "off." The turning of the index gear 41 in an anti-clockwise direction, as shown in Figure 8, will cause the stop pin 42 to limit the travel of the long pin 82 of the disc 79.

As soon as the motor is connected to the line, the pinion 89 moves continuously and drives gears 77, 83 and 84 as explained supra. The connecting rod 75 which is hitched to stud 68 of the sliding pawl plate 61 will give the same a reciprocating motion. Depending on whether the throw-over cam 54 is in the "on" or "off" position, the pawls 62 and 71 will engage the pins of discs 78 and 79. If the throw-over cam 54 is in the "on" position the pawl 71 will engage one of the pins 80 of the disc 79 and will turn this disc one pin ahead for each stroke. As the pawl 71, by the motion of the sliding plate 61, which slides on studs 56 and 59, moves back, the pawl 62, on the fixed plate 60, will engage one of the pins 80 and will hold the disc 79 and prevent the same from rotating back with the pawl 71. At the end of the stroke of the sliding plate 61, pawl 71 will engage another pin 80 and will drive disc 79 ahead another step. This will be continued until the disc 79 has rotated to a position where the long pin 82 engages the throw-over cam 54. When next the pawl 71 engages the last pin of disc 79 the long pin 82 engages the throw-over cam 54 and throws same into its "off" position, thereby pivoting the pawl plates 60 and 61 on their fixed pivots 59 into engagement with the pin rack 78 which governs the "off" interval. Depending upon the setting of the knob 27 and stop pin 37, the pawl 71 will now engage the pins of the disc 78 and repeat the same operational cycle as described for disc 79 supra, until the long pin 81 engages the throw-over cam 54 and the pawl 71 engages the last pin 80 of the disc 78 whereby the throw-over cam 54 will again be snapped over to the "on" position and a new "on" period begins.

In addition to the functions described supra, the pawl plate 61 also has the function of operating the valve disc 31 and concurrently also the switch 52 and 53. The operation of the valve and the switch occurs on the first stroke on the "on" or "off" cycle, respectively. The end of the sliding pawl plate 61, when it goes to the "on" position, engages the pin 50 of the valve plate 31 and turns same around its pivot 32 into the "on" position. At the same time, the insulating cam 47 closes the switch contacts 52 and 53. When, at the end of the "on" period, the sliding pawl plate 61 is thrown over to the "off" position, the first stroke of the pawl plate 61 will bring the end of same into engagement with the pin 49 and will throw the valve plate 31 into the "off" position, thereby also opening the switch as shown in Figure 10. During both of these operational half cycles the pin racks 78 and 79 are continuously driven by the gears 84 and 88, respectively, but due to the frictional clutch between these gears and the discs 78 and 79, the rack which is being operated by the pawl 71 is held by pawl 62 and thus prevented from moving while the pawl 62 and 71 are engaged. The other pin rack, however, which is not engaged by the pawls 62 and 71 will be automatically returned to its stationary position which is governed by the position of the stop pins 37 and 42, respectively, against which the long pin 81 and 82 strike at the end of their travel. By the time the "on" period, for instance, has been completed, the pin rack 78 has been returned to its starting position with the long pin 81 held against the pin 37. Thus the same number of pins 80 will be engaged in each succeeding "off" period and similarly for the "on" period depending upon the setting of the knobs 26 and 27, respectively. The forward movement of disc 78 is furthermore limited by the stop pin 90 against which the long pin 81 will strike at the end of its clockwise travel. Similarly the stop pin 91 will limit the anti-clockwise travel of disc 79 by striking against the long pin 82.

In a preferred application of this invention, the switch 52 and 53, in its "on" position, closes the circuit of an electric motor driving a pump which furnishes pressure to the inlet tube 34 of the valve block 30. This pressure may then be used through the outlet valve 28 and 29 as described supra. When the sliding pawl plate 61 is thrown into the "off" position, the valve plate 31 is turned thereby opening the switch 52 and 53 which stops the motor and pump and simultaneously the pressure is released through the opening 48.

It is to be understood that the form of my invention, herewith shown and described, is to be taken as a preferred example of the same, and that various changes in the shape, size and arrangement of parts may be resorted to without departing from the spirit of my invention or the scope of the subjoined claims.

Having thus described my invention I claim:

1. An interval timer of the character described having in combination a pair of rectangular mounting plates; a plurality of posts whereby said plates are rigidly mounted together; two similar shafts being rotatably mounted transversely through said plates and having their ends extending outside of said plates on one side of same; a couple of handles attached to the protruding ends of said shafts; two similar notched wheels mounted one on each of said shafts between said plates, said wheels being rotatable by said handles attached to the outside ends of said shafts; two similar stop springs being mounted on one of said plates adjacent to said notched wheels and one of said springs being in engagement with the notched peripheries of each of said wheels; a plurality of stop pins mounted one on each of said wheels and one adjacent to each of said wheels adapted to engage the pins in said wheels; a pin rack wheel rotatably mounted upon each of said shafts adjacent to said notched wheels, said pin rack wheels each having a plurality of equally long pins mounted axially along the outer periphery of the wheels and in addition one pin longer than the others extending further toward said notched wheels and being adapted to engage the stop pins of said notched wheels; a synchronous motor mounted on the outside of one of said plates and having a shaft extending through said plate; a pinion mounted on said motor shaft; a gear rotatably mounted on each of said transverse shafts adjacent to said pin rack wheels, one of said gears being in direct engagement with said motor pinion; a reversing gear rotatably mounted on the inside of the plate carrying the motor, said reversing gear being in engagement with the motor pinion and with the second gear mounted on said transverse shafts; a throw-over cam mounted on a stud on one of said plates; a double pawl mechanism slidably mounted with one end upon a stud on said throw-over cam and with its other end upon a stud fixed to one of said plates, said pawl mechanism being adapted to engage alternately either of said pin rack wheels according to the position of said throw-over cam; a connecting rod rotatably fastened with one end to an eccentric crank on the side of said reversing gear and having the other end rotatably connected to the end of said double pawl mechanism; a valve block fastened on the inside of one of said plates, and a spring loaded valve plate rotatably mounted on the inner face of said valve block, said valve plate being in operable engagement with said double, sliding pawl mechanism.

2. An interval timer of the kind described in claim 1 where said throw-over cam has a nose-formed extremity having two indentations, and a stop spring mounted on one of said rectangular plates, said stop spring being in engagement with one of said indentations in said throw-over cam in each of its positions whereby said cam is held in a definite position and thereby bringing the double pawl mechanism into engagement with either of said pin rack wheels.

3. An interval timer of the kind described in claim 1 where said valve plate has two pins, one on either side of its pivoting point, said pins being engageable with the end of said double pawl mechanism; an insulating cam mounted transversally upon said valve plate; an insulating terminal block mounted on the inside of one of said rectangular plates adjacent to said valve block; a plurality of jack switch springs being mounted on said terminal block in operable relation to said insulating cam whereby said valve and said switch may be simultaneously opened and closed by the action of said double sliding pawl mechanism.

4. A timer comprising a pair of manually adjustable stop members; a pair of rotatable rack members each engageable in one of its rotative positions with one of said stop members; continuously moving time controlled driving means frictionally coupled to said rack members to urge each of them toward engagement with its associated stop member; a shiftable reciprocating pawl means reciprocated by said driving means and alternatively shiftable into engagement with either of said rack members for driving the same away from engagement with its associated stop member; shifting means associated with said pawl means; means on each rack member engageable with said shifting means upon predetermined rotation of said rack member by said pawl means to shift said pawl means out of engagement with said rack member and into engagement with the other rack member, and mechanism controlled by the shifting of said pawl means.

5. A timer comprising a pair of manually adjustable stop members; a pair of rotatable rack members each engageable in one of its rotative positions with one of said stop members; continuously moving time controlled driving means frictionally coupled to said rack members to urge each of them toward engagement with its associated stop members; a shiftable reciprocating pawl means reciprocated by said driving means and alternatively shiftable into engagement with either of said members for driving the same away from engagement with its associated stop member; shifting means associated with said pawl means and comprising a cam member rotatably mounted at one end; means on each rack member engageable with said shift means upon predetermined rotation of said rack member by said pawl means to shift said pawl means out of engagement with said rack member and into engagement with the other rack member, and mechanism controlled by the shifting of said pawl means.

6. A timer comprising a pair of manually adjustable stop members; a pair of rotatable rack members each engageable in one of its rotative positions with one of said stop members, continuously moving time controlled driving means frictionally coupled to said rack members to urge each of them toward engagement with its associated stop member; a shiftable reciprocating pawl means reciprocated by said driving means and alternatively shiftable into engagement with either of said rack members for driving same away from engagement with its associated stop member, said reciprocating pawl means comprising a member slidably mounted, a two-fingered forward moving pawl mounted on one side of said sliding member, and a similar two-fingered stationary holding pawl mounted upon a fixed member adjacent to said sliding member; shifting means associated with said pawl means; means on each rack member engageable with said shifting means upon predetermined rotation of said rack member by said pawl means of shifting said pawl means out of engagement with said rack member and into engagement with the other rack member, and mechanism controlled by the shifting of said pawl means.

7. A timer comprising a pair of manually adjustable stop members; a pair of rotatable rack members each engageable in one of its rotative positions with one of said stop members; continuously moving time controlled driving means frictionally coupled to said rack member to urge each of them toward engagement with its associated stop member; a shiftable reciprocating pawl means reciprocated by said driving means and alternatively shiftable into engagement with either of said rack members for driving the same way from engagement with its associated stop member; shifting means associated with said pawl means; means on each rack member engageable with said shifting means upon predetermined rotation of said rack member by said pawl means to shift said pawl means out of engagement with said rack member and into engagement with the other rack member, said means comprising an elongated pin member fastened in said rack members, said pin members being engageable with cam members of said shifting means, and mechanism controlled by the shifting of said pawl means.

JAMES B. MARIS.